Sept. 23, 1958    A. G. SCHRAMM    2,853,308
ELEVATABLE STRADDLE TYPE CARRIER
Filed March 27, 1957
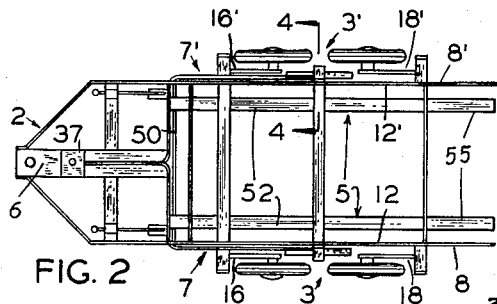
FIG. 2
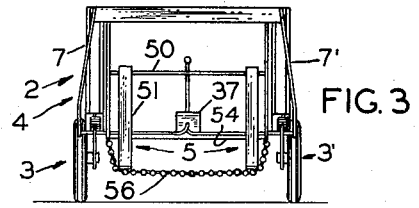
FIG. 3
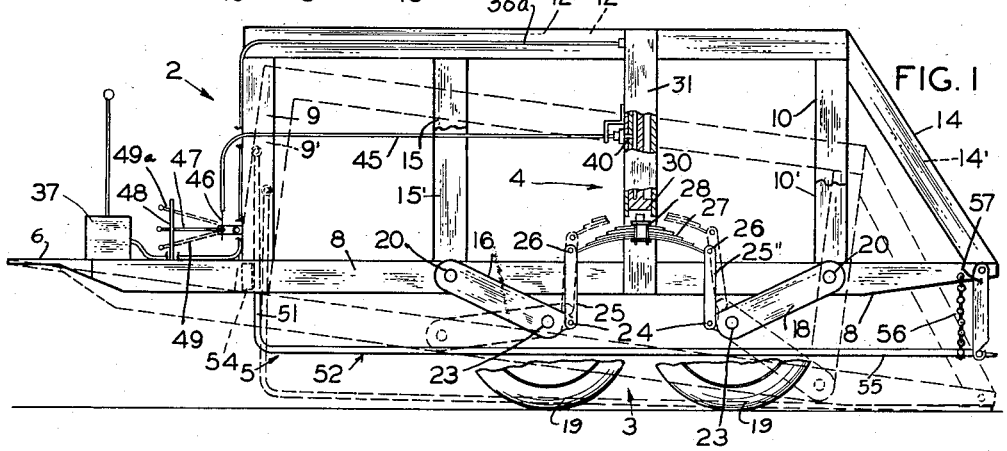
FIG. 1
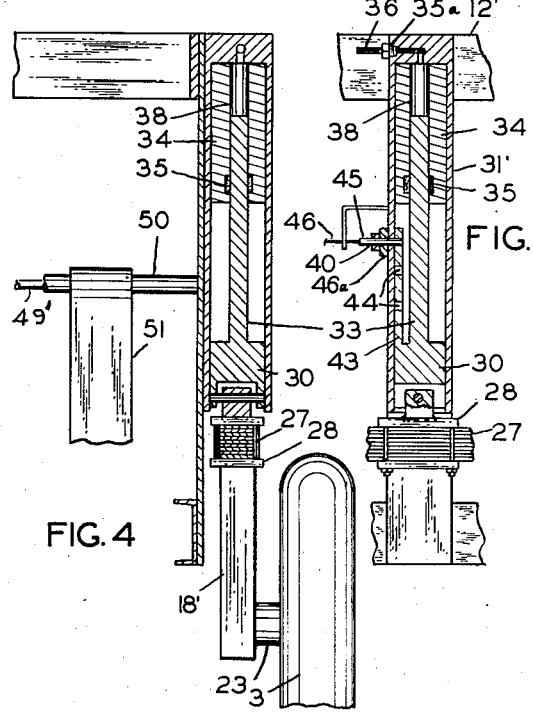
FIG. 4
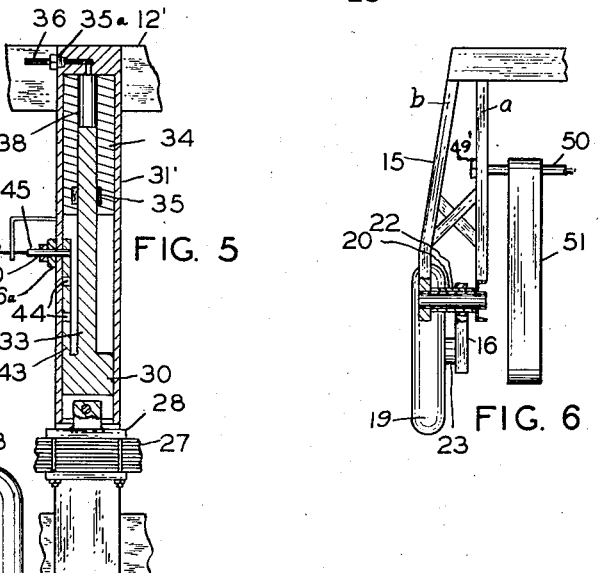
FIG. 5 · FIG. 6
INVENTOR.
Arthur G. Schramm
BY Scott L. Norvell
Atty

United States Patent Office 2,853,308
Patented Sept. 23, 1958

2,853,308

ELEVATABLE STRADDLE TYPE CARRIER

Arthur G. Schramm, Phoenix, Ariz.

Application March 27, 1957, Serial No. 648,978

5 Claims. (Cl. 280—44)

This invention concerns an elevatable straddle type trailer.

More particularly this invention concerns a trailer, or the like, of the straddle type having hydraulically operated means for raising and lowering the trailer body and being adapted to carry loads between laterally disposed vertical wheel suspensions of tandem type wheels.

One of the objects of the device is to provide a trailer with a bottomless body which is adapted to straddle and carry loads within the bottomless body structure, and to provide means to raise and lower the body relative to the ground;

Another object is to provide a trailer having a body of the straddle type, which is supported on tandem wheels, which may be raised or lowered by mechanical means and have automatic raising means to lift and hold the entire trailer and the load carried by it.

Still another object is to provide a trailer, of the type above mentioned, with fork mechanism which can be lowered and then inserted under pallets, carrying materials such as bricks, and having means for supporting the free ends of the forks within the body after they are loaded.

Other objects will appear hereinafter.

I attain the foregoing objects by means of the parts, devices, and particular structures shown in the accompanying drawings, in which—

Figure 1 is a side elevational view of a trailer incorporating my improvement;

Figure 2 is a plan view thereof drawn on a reduced scale;

Figure 3 is a rear end elevational view drawn on a reduced scale;

Figure 4 is an elevational sectional view of a lateral lifting element, drawn on an enlarged scale, and taken on line 4—4 Figure 2;

Figure 5 is a sectional elevational view of the lateral lifting element as shown in Figure 1, and drawn on a somewhat enlarged scale, and Figure 6 is an end elevational view of one of the wheel arm supporting stanchions.

Similar numerals refer to similar parts in the several views.

Broadly considered, my improved trailer consists of a body frame 2, laterally positioned tandem pairs of wheels 3 and 3', hydraulic means 4 for raising and lowering the body, relative to the wheels, and load carrying forks 5 within the body. A toying means including drawbar 6 is at the front end of body 2.

The body frame 2 is of the load straddling type made of steel shapes and members, and as shown has no floor. Included in the body there are right and left side frames 7 and 7' having bottom girders 8 and 8' from which front supports 9 and 9' extend upward from the girders 8 and 8' and back supports 10 and 10' which extend upward from the rear portions of girders 8 and 8'. These supports are joined at the top by rails 12 and 12'. Angularly extending braces 14 and 14' join the rear ends of the top rails, respectively, to the rear ends of the side girders 8 and 8'.

Rearward from the front supports 9 and 9' there are forward vertical wheel stanchions 15 and 15' which pivotally support forward, rearwardly extending wheel arms 16 and 16'. The back supports 10 and 10' are made as stanchions to pivotally support the upper ends of forwardly extending rear wheel arms 18 and 18'.

The wheel arms 16 and 16' and 18 and 18' are supported on short shafts extending transversely through the bottom portions of the inner and outer members of a and b of stanchions 15 and 15' and 10 and 10'. A bearing tube 20 is attached to the upper pivoted end of each of the wheel arms. This bearing is supported in each of the stanchions by a short bolt type shaft 22. The lower end portion of each of the wheel arms is provided with a wheel spindle 23 on which wheels 19 are mounted. At the lower end of each of the wheel arms there is a lug having a bearing pin 24 which is used as a means for pivotal attachment to a link 25. Each of the links 25 is attached by shackles 26 to the respective ends of a semi-elliptic leaf spring 27. It is to be understood that each of the wheel arms is attached to one of the links 25 and that the forward link (25) is balanced by the counterpart (25") at the rear. The spring 27, as shown in Figure 1, extends fore and aft of the body of the trailer and is held in the middle by clamp 28 which is attached to a slide block 30.

Throughout this specification, the primed numerals are used to designate the right-hand parts while the corresponding left-hand parts are indicated by numerals without the primes. Where the parts are described on one side, only, of the trailer body it is to be understood that there are similar parts on the opposite side of the trailer body.

Left and right slide block guide channels 31 and 31' extend upward from the bottom girders 8 and 8' to the top rails 12 and 12'. Slide blocks 30 slide upward and downward in these channels.

In the center of the slide blocks 30 on each side of the body 2 there is an upwardly extending piston rod 33 which operates in a cylinder 34.

A packing gland 35 at the bottom of cylinder 34 makes a fluid type gland fitting for the piston rod and a threaded nipple 36 at the top of the cylinder 34, provides a connection means to pipe 36a, which leads to a hand-operated hydraulic pump 37 attached to the forward end of the trailer body.

Introduction of fluid into the space 38 at the top of cylinder 34 forces piston 33 downward and lowers the slide block 30. This, in turn, lowers spring 27, links 25 and wheels 19 relative to the body 2.

To provide a means for holding the slides 30 at any position along their travel, there is a latch bolt 40 working fore and aft on one side of the guide channel 31. An upwardly extending metal strip 43, attached at its bottom to slide member 30, is provided with a plurality of holes 44, along its length disposed to receive the inner end of bolt 40.

Latch bolt 40 is slidably operated by a stiff metal wire 46 which extends through flexible tube 45. This wire and tube extends to the forward part of body 2 and is attached to a resilient latch lever 47 which may be positioned in desired positions in notched plate 48 to provide the resilient urge necessary to insert or withdraw latch bolt 40 from holes 44 in strip 43.

The latch is shown in engaging position in Figure 5, and, while in this position is retained by the clamping action of the hole 44 in plate 43 against the support 46a on guide member 31. If now the lever 47 is moved to the lowered position 49, indicated by dotted lines Figure 1, a strain is placed on wire 46, tending to pull the latch outward to disengaging position. If the pump 37 is then operated so that the fluid is introduced into space 38, the weight of the trailer body relative to the spring clamp 28 and slide member 30 is removed, and when this takes place the strain on wire 46 will immediately withdraw the latch bolt from the hole 44 in plate 43.

Conversely, if it is desired to latch plate 43 in position as provided by any of the holes 44, the strain latch lever 48 may be moved to the upper position 49a, whereupon a strain is placed on latch pin 40 to move inward. If the body is then moved relative to the slide 30, the latch will tend to enter any one of the holes 44 that comes in to register.

At the forward end of the body 2 there is a transverse tube 50 attached to side members of the frame by threaded rod 49'. The upwardly extending arms 51 of L-shaped fork members 52 are welded to tube 50, and this provides a means for their pivotal support. The tube and fork members may be detached and removed or withdrawn by sliding out and removing rod 49'. When unloaded the horizontal arms 55 of the fork members are supported by contact of the mid portion of the vertical arms 51 with the transverse frame member 54 which joins the front ends of the body parts, such as girders 8 and 8'. When loaded further support for the rear ends of the fork members may be afforded by the hooks 57, which are pivotally attached to the rear ends of girders 8 and 8', or by a chain loop 56, also supported on the girders.

I claim:

1. In an elevatable straddle type carrier having a body frame with side frames, a drawbar at the front end, laterally disposed tandem wheels supported on wheel arms on each of said side frames, springs connected by links to said wheel arms, supported on slide blocks vertically slidable in guide channels on said side frames and operated by hydraulically operated pistons, latching mechanism for said slide blocks consisting of vertical strips attached at their bottom ends to one side of said blocks perforated by vertically spaced holes, latch bolts slidably operating in the side of said guide channels adjacent said perforated strips, flexible wires attached to said bolts and slidably operating in flexible tubes, said wires and tubes extending to the forward part of said body frame adjacent said drawbar, spring supported operating flexible handles attached to the forward ends of said wires, having detaining means for resiliently urging said wires and bolts to latching position with said bolts extended into holes in said strips, and for resiliently urging said bolts to unlatching position with said bolts removed from said holes in the strips.

2. In an elevatable straddle type carrier having a body frame with side frames, a drawbar at the front end, laterally disposed tandem wheels supported on wheel arms on each of said side frames, springs linked to said wheel arms and supported on slide blocks vertically slidable in guide channels on said side frames and operated by hydraulically operated pistons connected to said slide blocks, intermediately positioned horizontal transverse frame members joining the front ends of said body frame sides, means for attaching, lifting, and carrying a load within said body frame consisting of L-shaped fork tines pivotally supported at the upper ends of their vertical arms on a transverse bar extending across the front ends of said body side frames and with their horizontal portions extending rearwardly to slide under and lift a load, and with the mid portions of their vertical portions contacting forwardly disposed horizontal transverse body members to limit downward hinging motion.

3. In an elevatable carrier having a body with side frames, guide channels in said side frames, a drawbar at the front end of said body, laterally disposed wheels supported on wheel arms on each of said side frames, springs linked to said wheel arms and supported on slide blocks vertically slidable in said guide channels on said side frames and operated by hydraulically operated pistons connected to said slide blocks, horizontal transverse frame members joining the front ends of said body side frames, means for attaching, lifting, and carrying a load within said body frame consisting of L-shaped fork tines supported in said body with their horizontal portions extending rearwardly to slide under and lift a load.

4. In an elevatable carrier having a body with side frames, guide channels in said side frames, a drawbar at the front end of said body, laterally disposed wheels supported on wheel arms on each of said side frames, equalizing means pivotally attached to slide blocks vertically slidable in said guide channels on said side frames and operated by hydraulic means connected to said slide blocks, horizontal transverse frame members joining the front ends of said body side frames, means for attaching, lifting, and carrying a load within said body frame consisting of L-shaped fork tines supported in said body with their horizontal portions extending rearwardly to slide under and lift a load, and link chain means extending transversely from the rear portions of said side frames under the rear ends of the horizontal portions of said L-shaped fork tines.

5. In an elevatable carrier having a body with side frames, guide channels in said side frames, a drawbar at the front end of said body, laterally disposed wheels supported on wheel arms on each of said side frames, equalizing means pivotally attached to slide blocks vertically slidable in said guide channels of said side frames and operated by hydraulically operated pistons connected through resilient means to said slide blocks, horizontal transverse frame members joining the front ends of said body side frames, means for attaching, lifting, and carrying a load within said body frame consisting of L-shaped fork tines removably attached within said body with their horizontal portions extending rearwardly to slide under and lift a load, and means connected to said body for maintaining the said horizontal portions of said fork tines horizontal when said tines are lifted from the ground.

References Cited in the file of this patent

UNITED STATES PATENTS

| 2,644,696 | Bill | July 7, 1953 |
| 2,774,604 | Rendel | Dec. 18, 1956 |